Jan. 20, 1959 — W. P. SCHMITTER — 2,869,384
SPEED REDUCER
Filed Aug. 24, 1951 — 3 Sheets-Sheet 1
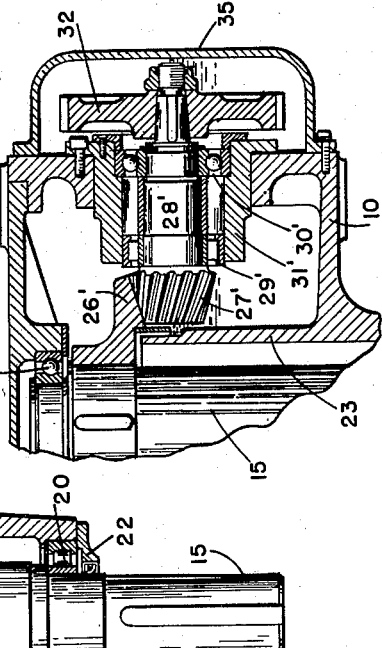
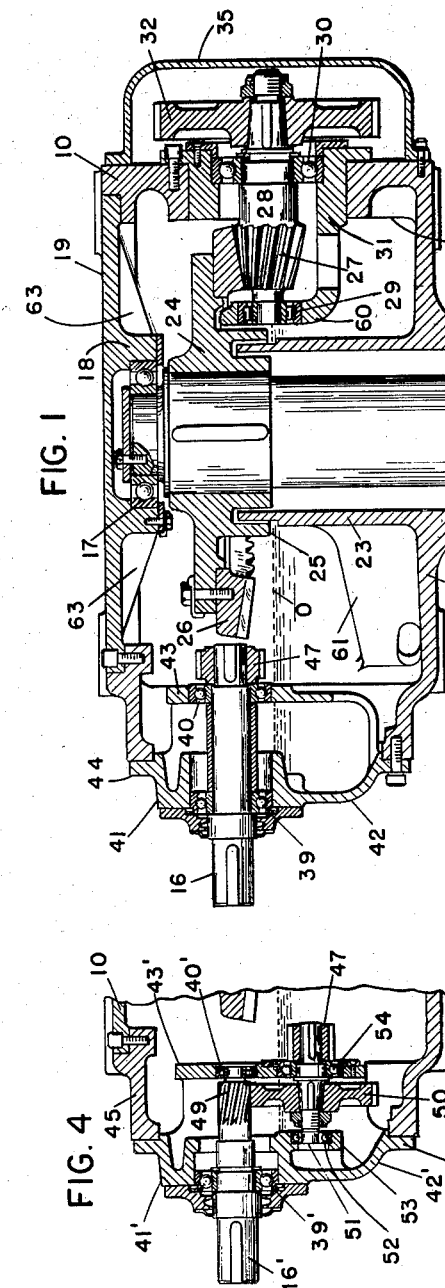
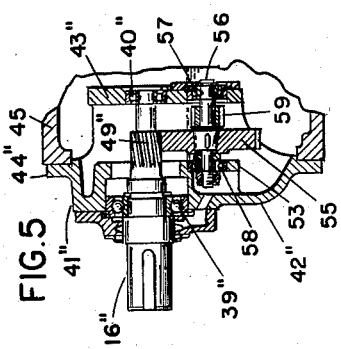
INVENTOR.
Walter P. Schmitter
BY
ATTORNEY Jan. 20, 1959 W. P. SCHMITTER 2,869,384
SPEED REDUCER
Filed Aug. 24, 1951 3 Sheets-Sheet 2
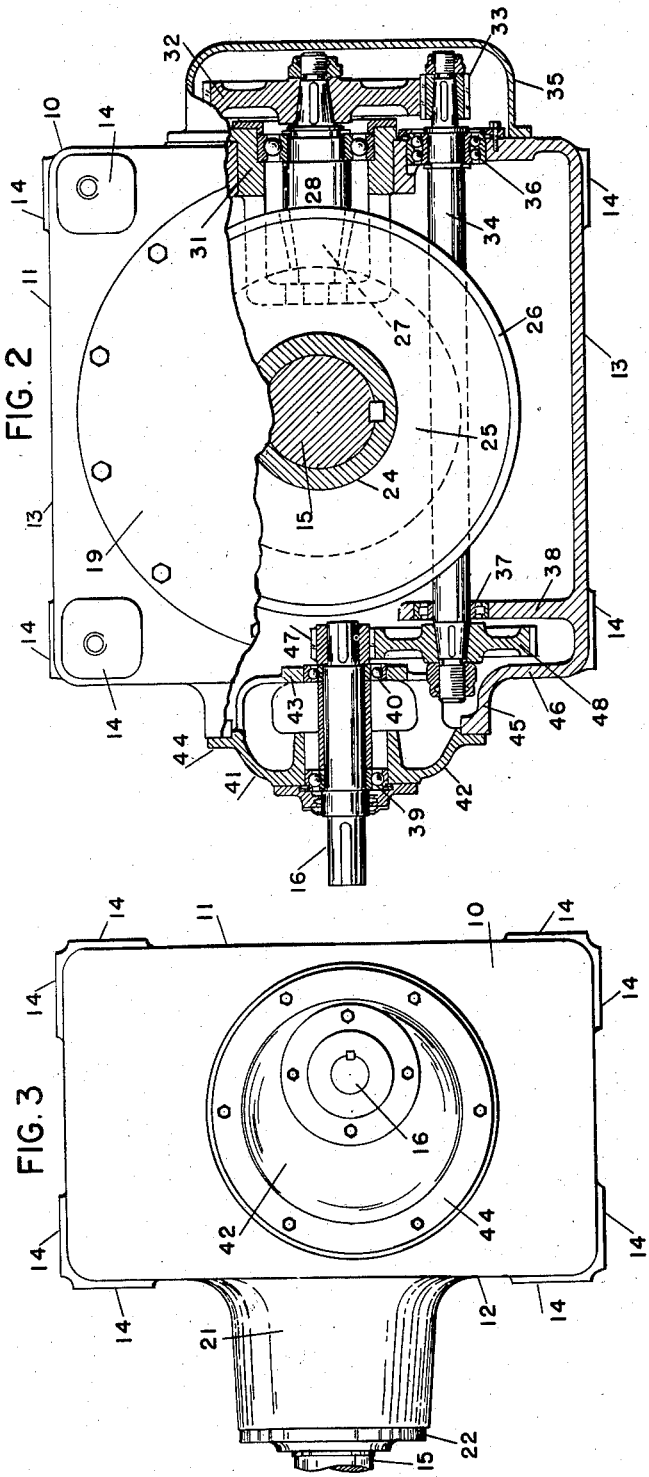
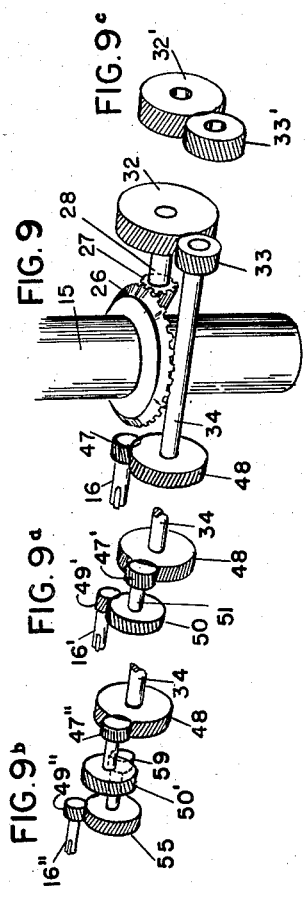
INVENTOR.
Walter P. Schmitter
BY
ATTORNEY

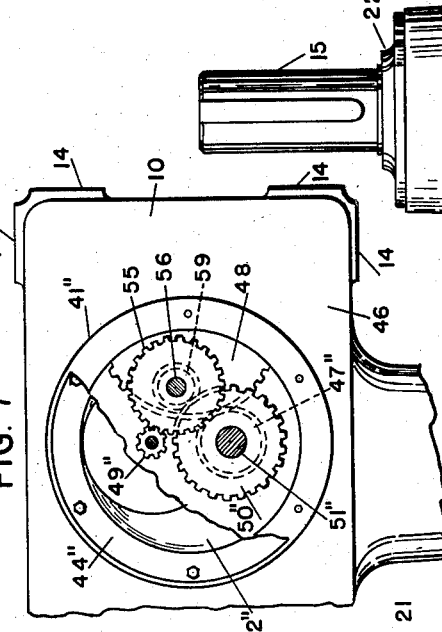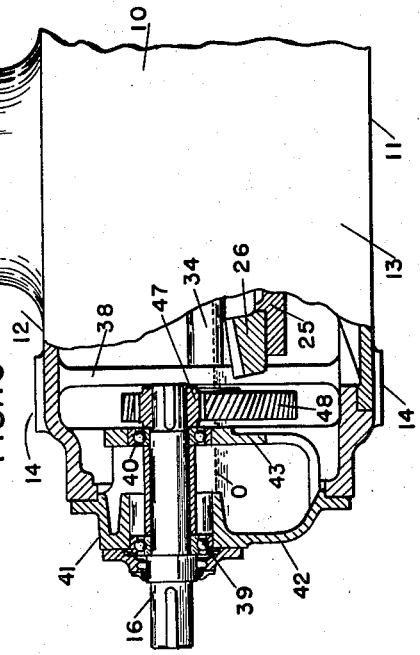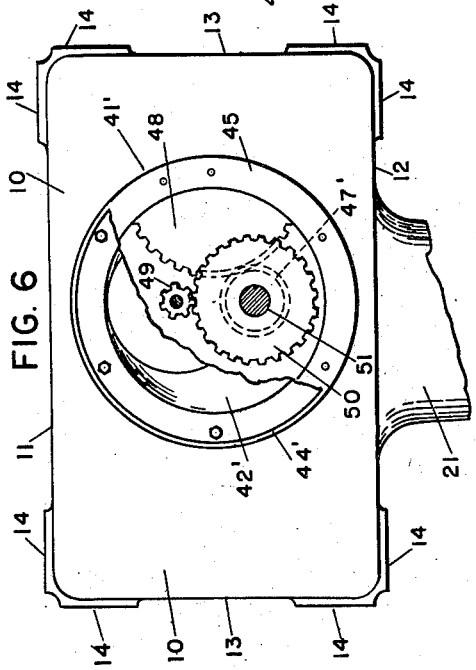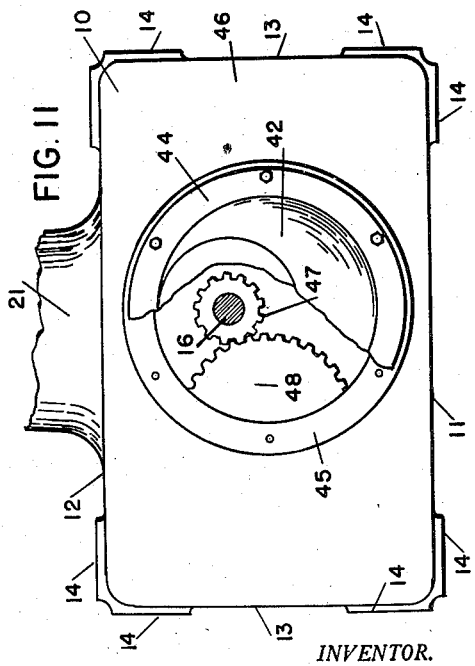

United States Patent Office 2,869,384
Patented Jan. 20, 1959

2,869,384

SPEED REDUCER

Walter P. Schmitter, Wauwatosa, Wis., assignor to The Falk Corporation, Milwaukee, Wis., a corporation of Wisconsin Application August 24, 1951, Serial No. 243,516

8 Claims. (Cl. 74—420)

This invention relates to speed reducers of the right angle type.

Speed reducers are self-contained articles of commerce extensively used throughout industry as a power transmitting medium between a prime mover and a driven mechanism and commonly as a means for converting the relatively high rotative speed of an electric motor to a relatively low rotative speed peculiarly suited to the individual requirements of the mechanism driven thereby. They are less commonly employed to effect operation of a driven mechanism at a speed higher than that of the prime mover.

Speed reducers include a housing that provides support for a power input shaft for connection to a prime mover and a power output shaft for connection to the mechanism to be driven, the housing also functioning as a lubricant retainer and as an enclosure for a gear train through which the shafts are interconnected. In some instances these shafts are parallel or in substantial alignment, while in others they are arranged at right angles to each other, the particular arrangement in each instance being such as to accommodate the particular positional relation between the driving and driven mechanisms in any particular installation.

Some industrial applications require, for instance, that the power output shaft of the speed reducer extend vertically upward, some require that it extend downward, while others require that it extend horizontally, in some cases toward the right and in others toward the left, with respect to the power input shaft. Moreover, in some installations a floor mounting of the speed reducer is highly desirable, whereas in other cases a wall mounting or a ceiling mounting is definitely preferred.

In addition to the above noted widely varying positional requirements the various types and kinds of driven mechanisms call for a vast range of speed and torque which must be individually satisfied, and in some instances it is important that the speed reducer be adapted to provide variations in speed and torque in a particular installation.

A general aim of the present invention is to provide an improved speed reducer capable of a wider range of industrial applications than was heretofore possible.

A more specific object is to provide an improved speed reducer capable of satisfying a wider range of positional requirements.

Another object is to provide an improved speed reducer capable of satisfying a wider range of speed and torque requirements.

Another object is to provide a speed reducer having an improved arrangement of gearing which may be readily modified to provide any desired speed ratio between the input and output shafts throughout a widely extended range.

Other more specific objects and advantages will appear, expressed or implied, from the following description of a speed reducer embodying this invention.

In the accompanying drawings:

Figure 1 is a vertical sectional view of a speed reducer constructed in accordance with the present invention.

Fig. 2 is a top plan view thereof, partly in section.

Fig. 3 is a view in elevation looking toward the right in Fig. 2.

Figs. 4 and 5 are fragmentary sectional views respectively showing alternative forms of gear sets substituted for one of the gear sets shown in Fig. 2 for the purpose of changing the gear ratio of the transmission.

Figs. 6 and 7 are views in elevation with parts broken away to show the relative positions of the gears shown in Figs. 4 and 5, respectively.

Fig. 8 is a fragmentary sectional view illustrating a modified form of bevel gear arrangement.

Fig. 9 is a diagrammatic view showing in perspective the entire gear arrangement illustrated in Figs. 1 and 2.

Figs. 9a and 9b are diagrammatic views showing in perspective the alternative forms of gear sets shown in Figs. 4 and 5, respectively.

Fig. 9c is a view similar to Figs. 9a and 9b showing a replacement set of change gears.

Fig. 10 is a fragmentary view in elevation of the speed reducer in inverted position with parts broken away to illustrate an adjusted relation of a gear set therein.

Fig. 11 is a view in elevation looking toward the right in Fig. 10, with parts broken away to show the relative positions of the gears.

The speed reducer shown is contained within a substantially rectangular housing 10 having substantially flat top, bottom and contiguous side walls 11, 12 and 13, respectively, each adapted for attachment to a floor or other overhead or vertical wall support. For this purpose each of these walls is shown equipped with a set of four mounting pads 14 adjacent the corners thereof.

The housing 10 provides support for a low speed driven shaft 15 projecting from the bottom wall 12, a high speed driving shaft 16 projecting from an end thereof at right angles to the shaft 15, and an interconnecting gear train, hereinafter described, that may be readily modified to provide any desired gear ratio between these shafts throughout a wide range. The housing 10 also functions as a lubricant container, a splash system supplied from a bath of oil therein being utilized largely to lubricate the several rotating parts.

It will of course be understood that the rectangular housing formation together with the several attaching means angularly spaced about the longitudinal axis of the housing as above described makes it possible to mount the housing in any of several positions, so as to project the shaft 15 downward, as in Fig. 1, upward, as in Fig. 10, or horizontally in either direction, as in Fig. 3 to thereby adapt the speed reducer to the positional requirements of any given industrial installation.

The driven shaft 15 is shown supported at its inner end in a suitable bearing 17 fixed in an inverted cup-like formation 18 provided centrally of a disk 19 removably attached to the top wall 11 of the housing 10 and constituting a closure therefor. In this instance the bearing 17 is a combined radial and end thrust ball bearing of a well known type through which the shaft 15 is connected to the cover 19 in a manner to permit removal of the cover 19 and shaft 15, as a unit, from the housing. The lower end of the shaft 15 is sustained against radial displacement by a roller bearing 20, whose inner race is fixed to the shaft and removable therewith from the housing. The outer race of the bearing 20 is shown fixed in a hollow boss 21 projecting outwardly from the bottom wall 12 of the housing and closed by a sealed cover plate 22. A tubular formation 23 constituting an upward or inward extension of the boss 21 projects above the oil level O in the housing so as to prevent escape of oil from the housing to and through the bearing 20 when the housing is arranged in the position shown in Fig. 1. As a further precaution against loss of oil through the bearing 20, the upper end of the tubular formation 23 is closed by the hub 24 of an overlying disk 25 fixed to the shaft 15, the hub 24 being channelled to loosely receive the end of the tubular formation 23 for that purpose. The bearing 20 is preferably lubricated by grease packed therein and retained by the cover plate 22.

The disk 25 carries a bevel gear 26 of a size to permit the same to be removed from the housing 10 with the shaft 15, upon removal of the cover plate 19. The gear 26 meshes with a bevel pinion 27 carried by a pinion shaft 28 journalled in longitudinally spaced bearings 29 and 30 in a suitable cartridge 31. The cartridge 31 is removably fixed in that end of the housing 10 opposite the high speed driving shaft 16. The outer end of the shaft 28 projects beyond the housing and carries a gear 32 detachably fixed thereto. The gear 32 meshes with a pinion 33 detachably fixed to the projecting end of another shaft, a counter shaft 34 extending lengthwise of the housing. The gear 32 and pinion 33 constitute a set of change gears readily replaceable by other sets of change gears of different ratios, to thereby effect a change in the gear ratio between the shafts 15 and 16. One replacement set of change gears is shown at 32'—33' in Fig. 9c. The change gears 32 and 33 are preferably enclosed in a suitable auxiliary housing 35 detachably fixed to the housing 10.

As indicated in Fig. 2, the counter shaft 34 extends lengthwise through the housing 10 in a position laterally offset from the shaft 15 and beneath the gear 26. A suitable bearing 36 in one end wall of the housing supports one end of the shaft 34, the other end thereof being supported in a second bearing 37 seated in an appropriate bearing support 38 disposed in the opposite end of the housing.

The high speed shaft 16 is journalled in longitudinally spaced bearings 39 and 40 in a substantially circular cage 41 removably attached to the housing. In this instance the cage 41 is fashioned to provide a dished end wall 42 in which the bearing 39 is seated, and an integral plate 43 spaced inwardly from the wall 42 and providing support for the bearing 40. The end wall 42 terminates in a peripheral flange 44 adapted to seat on a circular flange 45 projecting from the housing end wall 46 and through which the cage 41 is attached to the housing. In the arrangement shown in Figs. 1 and 2, a pinion 47 fixed to the end of the shaft 16 meshes with a gear 48 fixed to the adjacent end of the counter shaft 34. This completes the driving connection between the shafts 16 and 15.

It will be noted that the pinion 47 and mating gear 48 provides one stage of speed reduction between the shafts 16 and 15, that the pinion 33 and mating gear 32 provides a second stage of speed reduction, and that a third stage of reduction is obtained by the bevel pinion 27 and mating gear 26. It will also be noted that the over all speed ratio between these shafts may be changed through a wide range by interposing the pinion 33 and gear 32 or by substituting therefor a set of change gears proportioned to provide the desired gear ratio. The changes may readily be made, after removal of the auxiliary housing 35, without disturbing any of the other operating parts.

The range of gear ratios between the shafts 16 and 15 may be further increased by providing one or more additional stages of speed reduction ahead of the gear 48. In the transmission shown this is accomplished by substituting for the removable cage 41 a similar cage carrying a shaft-driven speed reduction gear set and a pinion for meshing engagement with the gear 48. Cages adapted for this purpose are shown in Figs. 4, 5, 6 and 7 attached to the housing 10.

The cage shown at 41' in Figs. 4 and 6 comprises a substantially circular dished end wall 42' having a peripheral flange 44' for attachment to the circular flange 45 of the housing 10. The end wall 42' provides support for an inner plate 43' integral therewith but spaced therefrom. In this instance the high speed driving shaft 16' is journalled in longitudinally spaced bearings 39' and 40' seated in the end wall 42' and plate 43', respectively, the shaft 16' having a pinion 49 disposed between the bearings. The pinion 49 meshes with a gear 50 fixed to a second counter shaft 51 journalled at one end in a bearing 52 seated in a suitable bearing support 53 carried by the end wall 42' and also journalled in a bearing 54 in the plate 43'. The second counter shaft 51 extends through the plate 43' and the projecting end thereof carries a pinion 47' fixed thereto and adapted to mesh with the gear 48 heretofore mentioned. It will be noted that, with the cage 41' applied to the housing 10 in the manner shown and above described, the pinion 49 and mating gear 50 provide a single stage of speed reduction between the shaft 16' and pinion 47' in addition to the speed reduction provided by the meshing pinion 47' and gear 48.

The cage shown at 41'' in Figs. 5 and 7 includes a substantially circular dished end wall 42'' having a peripheral flange 44'' for attachment to the circular flange 45 on the housing 10. The end wall 42'' provides support for an integral plate 43'' spaced therefrom. The high speed driving shaft 16'' is journalled in bearings 39'' and 40'' seated in the wall 42'' and plate 43'', respectively, and has a pinion 49'' formed thereon in much the same manner as in the cage shown in Figs. 4 and 6. In this instance the pinion 49'' meshes with a gear 55 fixed to an auxiliary counter shaft 56 disposed laterally of and below the shaft 16''. The auxiliary counter shaft 56 is journalled in bearings 57 and 58 respectively seated in the plate 43'' and a suitable bearing support 53'' carried by the end wall 42''. The auxiliary counter shaft 56 also carries a pinion 59 that meshes with a gear 50'' carried by a second auxiliary counter shaft 51''. The counter shaft 51'' is disposed directly below the high speed shaft 16'', and in that respect these two shafts bear much the same positional relation as do the shafts 16' and 51 heretofore mentioned. Also, as in the gear set shown in Figs. 4 and 6, the counter shaft 51'' carries a pinion 47'' positioned to mesh with the gear 48 in the housing 10. It will be noted that the pinion 49'' and mating gear 55 provides one stage of speed reduction, and that the pinion 59 and meshing gear 50'' provide a second stage of speed reduction, in addition to the speed reduction stage effected by the intermeshing pinion 47'' and 48.

Referring to Figs. 1 and 2, it will be noted that the pinion 27 is disposed between the supporting bearings 30 and 29 and that the latter bearing is mounted in a rigid substantially L-shaped extension 60 of the cartridge 31. This arrangement is desirable in that it provides ample support for the pinion 27, well able to sustain the same against deflection under the reaction of the gear 26, and at the same time permits the use of a gear 26 of maximum diameter capable of transmitting a maximum torque to the shaft 15. In those instances where a maximum torque is not required a simple alternative arrangement, such as shown in Fig. 8, may be employed. In the latter arrangement a gear 26' smaller than gear 26 is employed, and the meshing pinion 27' is formed on the projecting end of a shaft 28' journalled in bearings 29' and 30', both of which are seated in a simple cylindrical cartridge 31' detachably fixed in the housing 10. As in the Fig. 1 arrangement, a change gear 32, detachably fixed to the outer projecting end of the shaft 28', meshes with the change pinion 33 on the shaft 34.

As hereinabove noted, the rotating parts of the speed reducer shown are largely splash lubricated from the bath of oil contained in the housing 10. For this purpose it is desirable to maintain the housing about half full of oil. It will be noted that when the transmission is used in the Fig. 1 position, with the shaft 15 downwardly extended, the shaft 16 and its bearings 39 and 40 are above a mid point of the housing and consequently above the oil level O, so that there is no danger of loss of oil through these bearings. However, if the structure shown in this figure should be inverted, so as to permit use thereof with the shaft 15 projecting upward, then the shaft 16 would lie below the oil level and thus permit the oil to escape through the bearings 39 and 40. In this instance this objectionable condition is avoided by the eccentric relation of the shaft 16 to the end wall 42 of the cage 41, as hereinabove mentioned, and by the further fact that the cage 41 may be rotatively adjusted through one hundred and eighty degrees, so as to invert the same relative to the housing 10. Such an adjusted position of the cage 41 is shown in Figs. 10 and 11, in which the housing 10 is shown in the inverted position above described and with the cage 41 in an adjusted position relative to the housing such as to position the shaft 16 and its bearings 39 and 40 above the oil level O.

A similar adjustment of the cage 41 through an angle of ninety degrees may be utilized to position the shaft 16 above the oil level in the housing 10 when the latter is used in a position with either of its sides 13 lowermost or serving as a mounting base.

From the foregoing description it will be noted that a speed reducer has been provided which is adapted for mounting with equal facility on a floor or on either an overhead or upright support, and with the shaft 15 projecting downward, upward or laterally in either direction regardless of the nature of the support, in a manner to satisfy the positional requirement of any particular industrial application. Moreover, the speed reducer shown provides an unusually extensive range of speed ratios between the shafts 16 and 15, which may be widely varied by interposing the change gears 32 and 33 or by substituting therefor mating change gears of other sizes, or by attaching to the housing 10 any of the plurality of cages 41, 41' or 41" so as to provide an additional stage or stages of speed reduction ahead of the gear 48, as and when necessary to satisfy the torque and speed requirements of a particular installation. In this connection it will be noted that any set of change gears 32—33 or 32'—33' may be used irrespective of the particular cage 41, 41' or 41" that may be selected for use, and that either the change gears or the cages, or both, may be readily replaced each quite independently of the other. Also, to meet other varied conditions of torque and speed the gear 26 and pinion 27 may be readily replaced by the gear and pinion 26'—27' or by gear and pinion sets of other sizes, the gear 26 being readily removable through the top of the housing for this purpose, and the pinion 27 being removable with the cartridge 31. These several features combine to provide a vastly wider range of industrial use than was heretofore possible in any speed reducer heretofore available.

It will be further noted that the rectangular form of housing not only affords the above noted versatile mounting but also provides a highly rigid structure well able to maintain an accurate meshing relation between the several gears and their mating pinions under the stresses to which they are subjected in normal use. In this instance the housing is further stiffened by webs or ribs 61, 62 and 63 arranged internally thereof so as to avoid external projections that night otherwise interfere with utilization of the housing walls as a means of mounting.

Various changes may be made in the invention hereinabove specifically described without departing from or sacrificing the advantages of the invention as defined in the appended claims.

I claim:

1. A speed reducer comprising the combination of a housing, driving and driven shafts journalled therein at right angles to each other, a gear fixed to said driven shaft to drive the same, a pinion meshing with said gear, a shaft supporting said pinion and axially withdrawable from said housing, and driving means between said driving shaft and said pinion shaft, said driving means comprising gears at one side of said housing readily replaceable to vary the speed ratio between said driving and driven shafts and speed reduction gearing at another side of said housing, said driven shaft and said first named gear being arranged for axial withdrawal as a unit from said housing.

2. A speed reducer comprising the combination of a housing, a driven shaft journalled therein, a cage detachably mounted in said housing, a driving shaft journaled in said cage, a pinion driven by said driving shaft, another shaft journalled in siad housing at right angles to said driven shaft, a gear on said other shaft meshing with said pinion, and means including reduction gearing connecting said other shaft in driving relation with said driven shaft.

3. A speed reducer comprising the combination of a housing, a driven shaft journalled therein, a cage detachably mounted in said housing, a driving shaft journalled in said cage, a pinion, means including reduction gearing supported by said cage for connecting said driving shaft in driving relation with said pinion, another shaft journalled in said housing and having a gear thereon meshing with said pinion, and means providing a driving connection between said other shaft and said driven shaft.

4. A speed reducer comprising the combination of a housing, a driven shaft journalled therein, a second shaft journalled therein and connected in driving relation with said driven shaft, a gear carried by said second shaft, a cage attachable to said housing and having a pinion supported thereby for connection with said gear, and a driving shaft journalled eccentrically of and in said cage and connected in driving relation with said pinion, said cage being rotatably adjustable to vary the position of said driving shaft relative to said housing.

5. A speed reducer comprising the combination of a housing adapted to retain a bath of lubricant therein, a driven shaft journalled in said housing and projecting beyond the bottom thereof, means including a tubular structure extending inwardly from the bottom of said housing and encircling said shaft to prevent loss of lubricant along said shaft, means for mounting said housing in any of a plurality of positions so as to project said driven shaft upward or downward or horizontally therefrom, a driving shaft projecting from said housing at right angles to said driven shaft, speed reduction gearing connecting said shafts in driving relation, and means for positioning said driving shaft above said bath of lubricant in any of said mounted positions of said housing.

6. A speed reducer comprising the combination of a housing, a driving shaft projecting from one side thereof, a driven shaft projecting from an adjacent side of said housing, another shaft journalled in said housing at right angles to said driven shaft, means including speed reduction gearing for connecting said driving shaft to said other shaft, and driving means between said other shaft and said driven shaft, said last named means including a set of change gears readily replaceable to vary the speed ratio between said driving and driven shafts, said change gears being disposed adjacent another side of said housing and readily accessible from outside said housing, and said last named means also including a set of gears between said change gears and said driven shaft.

7. A speed reducer comprising the combination of a housing, a pinion therein, a cage attachable to one wall of said housing for supporting said pinion, a driving shaft journalled in said cage, mean including speed reduction gearing carried by said cage for connecting said driving shaft in driving relation with said pinion, another shaft journalled in said housing having a gear thereon driven by said pinion, a driven shaft journalled in said housing, and means including speed reduction gearing for connecting said other shaft in driving relation with said driven shaft.

8. A speed reducer comprising the combination of a housing having end portions, a cage attachable to one of said end portions in any of a plurality of rotative positions, a driving shaft journaled eccentrically of and in said cage and projecting lengthwise of and from said housing, a driven shaft journaled in said housing and projecting laterally therefrom, driving connections including a plurality of speed reduction gear sets between said shafts, and a plurality of mounting pads angularly spaced about the longitudinal axis of said housing providing a vertical mounting means therefor, whereby said housing may be variously mounted to project from said driven shaft upward, downward, or substantially horizontally therefrom to satisfy the varied positional requirements of various industrial applications.

References Cited in the file of this patent

UNITED STATES PATENTS

| | | |
|---|---|---|
| 252 | Nelson et al. | June 30, 1837 |
| 1,536,824 | Domizi | May 5, 1925 |
| 1,911,666 | Beitz | May 30, 1933 |
| 1,961,809 | Wood | June 5, 1934 |
| 2,164,294 | Mahan | June 27, 1939 |
| 2,392,313 | Dahlstrand | Jan. 8, 1946 |
| 2,437,314 | Berndtson | Mar. 9, 1948 |
| 2,566,253 | Schmitter | Aug. 28, 1951 |
| 2,578,446 | O'Daniel | Dec. 11, 1951 |
| 2,623,406 | Hansen | Dec. 30, 1952 |

FOREIGN PATENTS

| | | |
|---|---|---|
| 619,237 | Great Britain | Mar. 7, 1949 |

UNITED STATES PATENT OFFICE
CERTIFICATE OF CORRECTION

Patent No. 2,869,384                             January 20, 1959

Walter P. Schmitter

It is hereby certified that error appears in the printed specification of the above numbered patent requiring correction and that the said Letters Patent should read as corrected below.

Column 4, line 20, for "42'" read — 42" —; column 5, line 61, for "night" read — might —; column 6, line 65, for "mean" read — means —.

Signed and sealed this 4th day of August 1959.

(SEAL)
Attest:

KARL H. AXLINE
Attesting Officer

ROBERT C. WATSON
Commissioner of Patents